(No Model.)

E. A. RICHARDSON.
BICYCLE PEDAL.

No. 341,946. Patented May 18, 1886.

Witnesses.

Inventor
Edwin A. Richardson
by Crosby & Gregory
attys.

UNITED STATES PATENT OFFICE.

EDWIN A. RICHARDSON, OF CUMBERLAND MILLS, MAINE.

BICYCLE-PEDAL.

SPECIFICATION forming part of Letters Patent No. 341,946, dated May 18, 1886.

Application filed January 16, 1886. Serial No. 188,743. (No model.)

*To all whom it may concern:*

Be it known that I, EDWIN A. RICHARDSON, of Cumberland Mills, county of Cumberland, State of Maine, have invented an Improvement in Bicycle-Pedals, of which the following description, in connection with the accompanying drawings, is a specification, like letters on the drawings representing like parts.

This invention has for its object to construct a pedal for bicycles, tricycles, &c., whereby an improved bearing-surface is given for the axle or spindle upon which the pedal revolves that it may better withstand the wear upon it, and whereby dust, &c., is more fully excluded, which latter, upon gaining access to the bearing portions of the axle, causes considerable wear.

In accordance with this invention, the two heads or end pieces of the pedal are connected by bars at opposite ends, upon which are placed the usual rubber pedals. A sleeve having suitable bushings fitted into it at each end is held in position between the two heads of the pedal by tightly fitting the same into recesses or sockets cut on the inner sides of the said heads. The axle or spindle upon which the pedal revolves passes through the heads or ends midway between the pedal-bars, and is provided with a flanged outer end, which is fitted into a recess cut in the outer side of the outer end piece or head, and the said axle or spindle is also passed through the said sleeve and has its bearings upon the said bushings.

Upon the end of the axle or spindle, projecting beyond the inside head of the pedal, is a collar having a flattened or squared end, which collar is attached to the crank of the machine, the said collar being splined upon the spindle and held in position on the usual crank and contiguous to the inside head by a nut screwed upon the extreme end of the said axle or spindle.

The invention consists in the combination, with the heads or end pieces of the pedal and its connecting-bars and a sleeve having bushings, of an axle or spindle having a flanged outer end and extended through the said head and sleeve and its bushings, the spindle having a collar placed upon it, to which is connected the crank of the machine, and a nut to hold the parts in their respective positions, all substantially as will be described.

Figure 1:
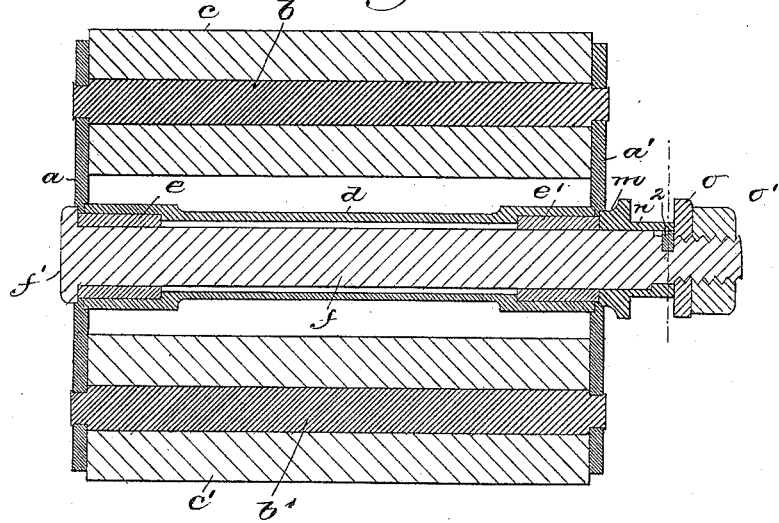
Figure 2:
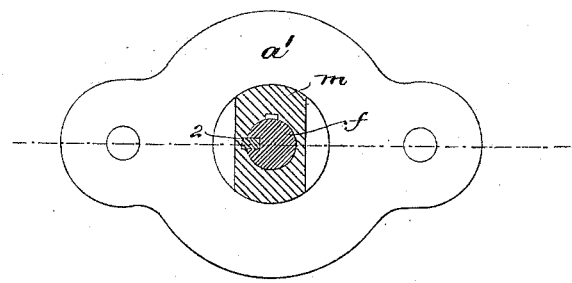
Figure 4:
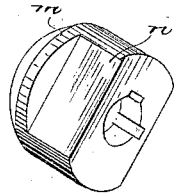

Figure 1, in longitudinal section taken on the dotted line *x x*, Fig. 2, shows a pedal constructed in accordance with this invention; Fig. 2, a cross-section of Fig. 1, taken on the dotted line *y y*; and Fig. 3 shows the collar detached; and Fig. 4 a perspective detail of the nut removed.

The two heads or end pieces, $a\ a'$, and the connecting-bars $b\ b'$, connecting the said heads at opposite ends and carrying the rubber pedals $c\ c'$, are all as usual, so need not be herein further described. The sleeve $d$, bored out at each end to receive bushings $e\ e'$, is held in position between the two heads or end pieces, $a\ a'$, by being tightly fitted into recesses cut on the inner sides of the said heads, the heads being connected together by the bars $b\ b'$, thereby preventing the removal of the sleeve $d$. The axle or spindle $f$, passed through the sleeve $d$, has its bearings upon the bushings $e\ e'$ at either end. The axle or spindle $f$ has at its outer end a flange or head, $f'$, which is fitted into a recess cut into the outer end of the outer head or end piece, $a$, the bearing-face of the said flange portion lying contiguous to the bushing $e$, so that a dust-tight connection is made at this portion of the pedal. The opposite end of the axle or spindle $f$ has splined or keyed upon it by a pin, 2, a collar, $m$, having a flattened or squared hub, $n$, to facilitate firm connection of the hub to the usual crank of the machine. The outer side of the head or end piece, $a'$, is recessed to permit the collar $m$ to enter slightly as it is placed upon the axle $f$, to thereby make a connection similar to the connection at the opposite end of the pedal, which may prevent the entrance of dust. The extreme end of the axle $f$ is screw-threaded to receive upon it a washer, $o$, and a nut, $o'$, firmly screwed thereon, thus binding the assembled parts together.

Figure 3:
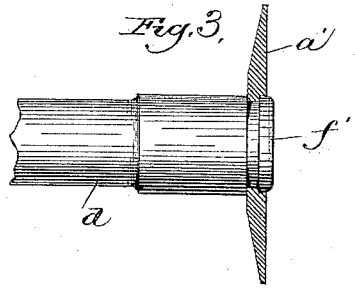

In Fig. 3 I have shown the head or end piece as having a comparatively-thick central portion and beveled or tapered at its ends, thereby permitting the recesses cut in the said end pieces to be of sufficient depth to exclude dust, &c., and by beveling reduce the weight of the pedal.

By the construction herein described a very even and perfect bearing is provided for the axle and the entire bearing-surface from access of dust, which is a very important advantage over the ordinary pedal now in use.

By making the bushing of brass, or a different metal from that used for the spindle, the chief wear comes upon the bushings, which may be readily renewed, as may also be the spindle, if desired, at but little cost.

Prior to my invention the collar $m$ and hub $n$ have formed an integral part of the spindle, making the spindle hard to reproduce, except at the factory by special dies; but by making the collar separate a new spindle may be cheaply produced by any blacksmith.

I am aware that pedals for bicycles have been made, consisting of two heads or end pieces and connecting-bars carrying rubber pedals, and also a sleeve through which the collar or spindle passes, a shaft being interposed between the sleeve and spindle at each end; also, that a loose cone has been interposed between the sleeve and spindle, which serves as a bearing for the sleeve at one end, the opposite end of the said sleeve bearing upon a tapering or conical portion of the spindle, and such construction I do not herein claim.

I claim—

1. In a pedal for bicycles or similar machines, the heads or end pieces, $a\ a'$, connecting pedal-bars $b\ b'$, and a sleeve reamed at each end to receive bushings, and held in position between the heads $a\ a'$, combined with an axle or spindle passing through the sleeve, independent bushings $e\ e'$, surrounding the axle and contained within the sleeve, a loose collar placed upon the projecting end of the axle or spindle, and a nut to bind the assembled parts together, all substantially as described.

2. In a pedal for bicycles or similar machines, the heads or end pieces, $a\ a'$, connecting pedal-bars $b\ b'$, the sleeve held in position between the heads $a\ a'$, and independent bushings contained within said sleeve, combined with an axle passed through the sleeve and bearing upon the bushings and having at its outer ends the head or flange $f'$, the collar having a hub to be attached to the crank of the machine and splined upon the axle, and the nut $o'$, to bind the assembled parts together, all substantially as described.

3. In a pedal for bicycles or similar machines, the heads or end pieces, $a\ a'$, having the thickened central portions and reduced end portions, as described, connecting pedal-bars $b\ b'$, and a sleeve having bushings fitted therein and held in position in recesses between the heads $a\ a'$, combined with an axle or spindle passing through the sleeve, a loose collar placed upon the projecting end of the axle or spindle, and a nut to bind the assembled parts together, all substantially as described.

In testimony whereof I have signed my name to this specification in the presence of two subscribing witnesses.

EDWIN A. RICHARDSON.

Witnesses:
ALFRED B. WINSLOW,
WM. H. SWETT.